United States Patent [19]
Zajicek

[11] Patent Number: 4,822,281
[45] Date of Patent: Apr. 18, 1989

[54] SHIPBOARD TRANSPORTATION SIMULATOR

[75] Inventor: Gayle T. Zajicek, Savanna, Ill.

[73] Assignee: The United States of America as represented by the Secretary of the Army, Washington, D.C.

[21] Appl. No.: 848,104

[22] Filed: Apr. 2, 1986

Related U.S. Application Data

[62] Division of Ser. No. 410,777, Aug. 23, 1982, abandoned.

[51] Int. Cl.$^4$ ............................................. G09B 9/06
[52] U.S. Cl. ..................................... 434/29; 73/865.3
[58] Field of Search .......................... 434/29; 73/865.3

[56] References Cited

U.S. PATENT DOCUMENTS

| | | | |
|---|---|---|---|
| 3,561,137 | 2/1971 | Guyon et al. | 434/29 |
| 3,871,113 | 3/1975 | Crago et al. | 434/29 |
| 3,984,924 | 10/1976 | Myles et al. | 434/29 |
| 4,680,013 | 7/1987 | Boutros | 434/29 |

FOREIGN PATENT DOCUMENTS 516930 7/1977 U.S.S.R. ............................... 434/29

OTHER PUBLICATIONS

*Mechanisms, Linkages and Mechanical Controls,* edited by Nicholas P. Chironis, title page, reverse of title, pp. 55 and 78, McGraw-Hill ©1965.

*Primary Examiner*—William H. Grieb
*Attorney, Agent, or Firm*—Robert P. Gibson; Edward Goldberg; Edward F. Costigan

[57] ABSTRACT

A shipboard transportation simulator to simulate rolling motion of a ship transporting ammunition in commercial containers. The cargo containers are mounted above the roll axis and adjustable counterweights are positioned below the axis. A Scotch-yoke structure converts a motor rotary drive to a longitudinal drive to rock the container and counterweights about a roll axis. A platform can also be attached to the Shipboard Transportation Simulator for testing restraint systems for break bulk cargo. The simulator operates continuously over long periods of time to produce the effects of fatigue, the compression of wood fibers, and the stresses on fasteners that tend to cause failures at sea. It is very useful in quickly developing restraining systems that are adequate for the job at the least cost. Provision is made for different rolling angles, different loads, and variable speeds.

4 Claims, 2 Drawing Sheets

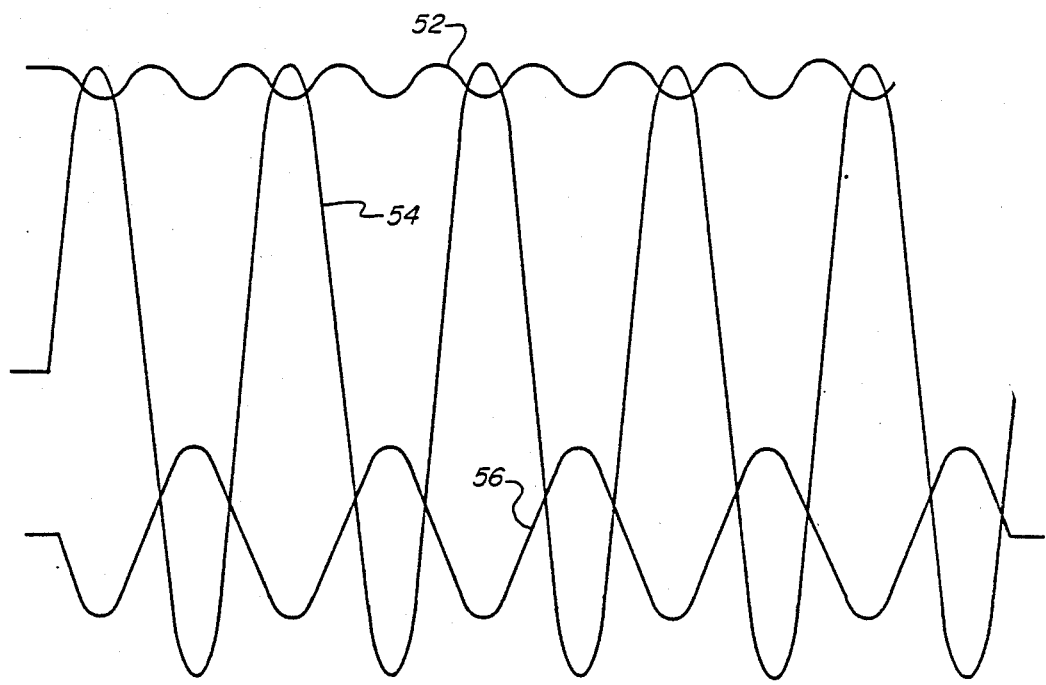
Fig_2_
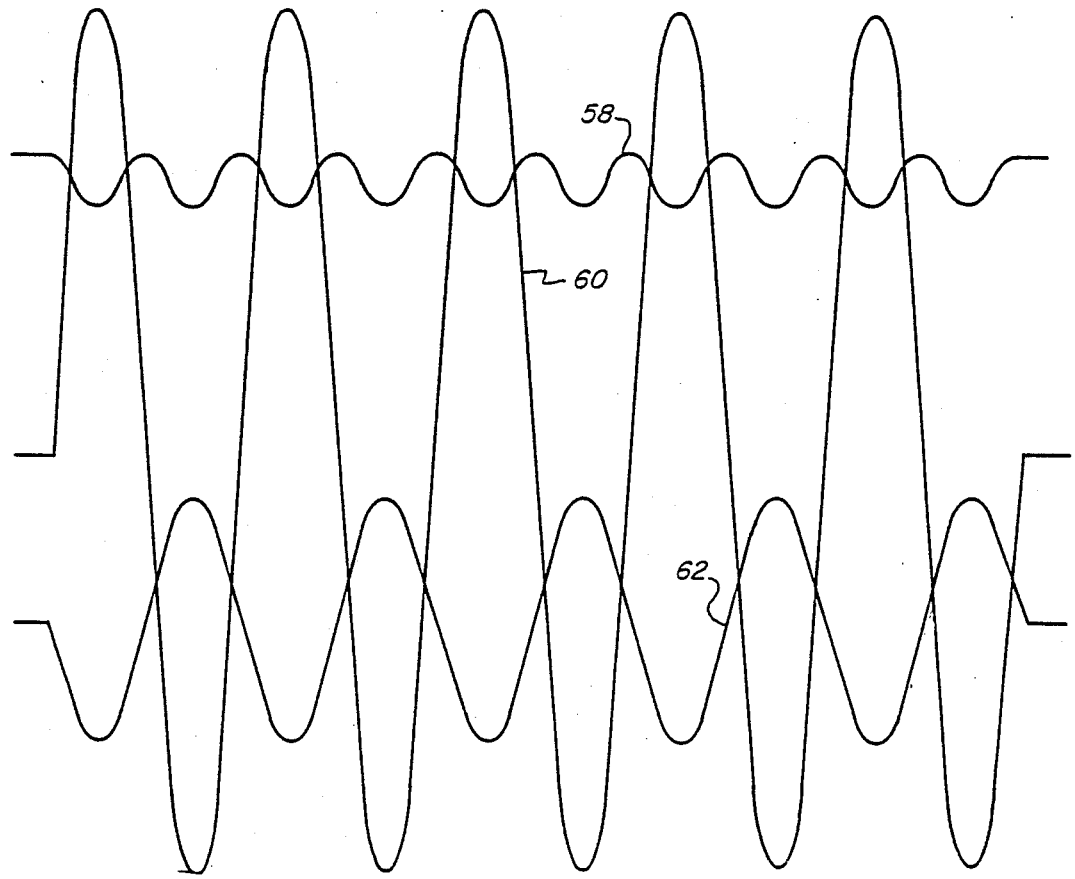
Fig_3_

SHIPBOARD TRANSPORTATION SIMULATOR

GOVERNMENT RIGHTS

The invention described herein may be manufactured and/or used by or for the Government for governmental purposes without the payment of any royalty thereon.

This application is a division of application, Ser. No. 410,777 filed Aug. 23, 1982, now abandoned.

BACKGRUOND OF THE INVENTION

In severe sea storms, ammunition cargo must be held, without failure, by restraint systems that will keep the cargo from breaking loose. These systems may consist of wooden braces, straps, latching devices, and similar restraints to prevent the cargo from shifting or breaking loose, with serious damage to the cargo and possible loss of the ship. Hence, a need exists for a mechanism or system to test, study, and analyze the stresses that are generated in such restraint systems to be assured that damage or loss does not occur due to failure of the restraint system used.

In the past, ammunition cargo containers and their restraint systems were tested by tilting a container on its side (80 degrees) by the use of three cranes, one 40 ton and 2–20 ton capacity. Continuous testing over a long testing period was truly expensive for the test results achieved. Moreover, the test did not realistically simulate the condition of the ship roll movement which is a reverse pendulum harmonic motion.

SUMMARY OF THE PRESENT INVENTION

In accordance with the present invention a simulator is provided that produces a reverse pendulum harmonic motion to a cargo container to simulate the roll movement of a ship in transporting the container. These containers typically are of $8' \times 8' \times 20'$ size and contain cargo up to 50,000 pounds. In one form this roll movement is accomplished by oscillating a container carriage frame on arcuate rails or guides passing over rollers. The container is mounted above the axis of rotation and is counterbalanced with adjustable weights.

A longitudinal driver is pivotally connected to the carriage frame at a point spaced from the axis of rotation to cause oscillation movement of the carriage frame. A motor with a rotary shaft is coupled to the driver through a Scotch-yoke mechanism. By placing the driver at various points on the frame, various angles of tilt can be produced. The adjustable counterweights can be shifted away and toward the axis of rotation to accommodate various cargo loads. An adjustment of an arm in the Scotch-yoke assembly will vary the acceleration of the rolling motion as desired. In the alternative, the motor may have a variable speed or the reduction gearing between the motor and Scotch-yoke assembly may be varied.

In operation, the counterweights are first extended the maximum amount from the axis of rotation of the simultator carriage frame. This prevents the frame with its raised cargo container from tipping over and thereby damaging the frame or its driving mechanism. A pressure gage and disconnect on the driven between the Scotch-yoke assembly and the carriage frame determines the desired distance of the counterweights from the axis of rotation of the frame in balancing the simulator against the weight of the cargo in the container. If the counterweights have not properly balanced with the frame and cargo container, excessive drive pressure is needed and the disconnect stops the operation. A special device for testing break bulk shoring can also be installed on the Shipboard Transportation Simulator in the same method as a container. When the special test device is on the Shipboard Transportation Simulator, containers can be tested.

BRIEF DESCRIPTION OF THE DRAWINGS

FIG. 2 is a graphic illustration of vertical and lateral acceleration and side wall loading in the simulation of a 30 degree roll angle with a 13 second period of oscillation, FIG. 3 is a graphic illustration similar to that shown in FIG. 2 except for a roll angle of 45 degrees.

DETAILED DESCRIPTION OF PREFERRED EMBODIMENTS

Figure 1:
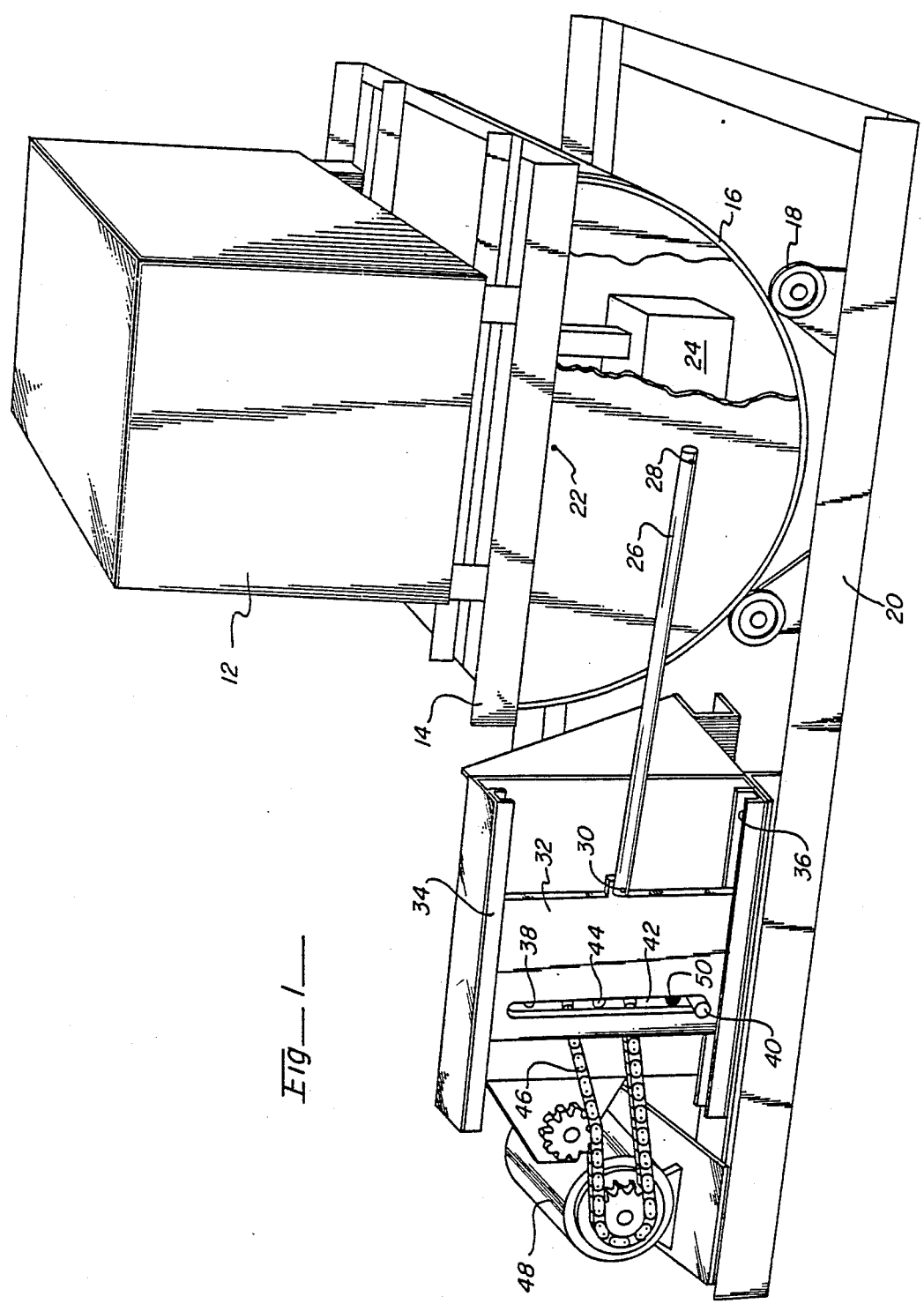
FIG. 1 is a perspective view of the simulator adapted to roll on arcuate guides.

Reference is made to FIG. 1 wherein there is shown a shipboard transportation simulator 10 consisting of a cargo container 12 mounted on a carriage frame 14. Within the container 12 is cargo, such as artillery projectiles for example, fastened down by timber bracing straps, fasteners, and other restraining devices, not shown. The purpose of the simulator is to simulate the rolling motion of a ship in a severe sea storm to see if the restraining devices are sufficient to retain the cargo in place.

The carriage frame 14 is supported by arcuate guides or tracks 16 positioned on rollers 18 mounted on a base 20. These rollers and arcuate tracks permit the cargo container 12 and carriage frame 14 to tilt or roll about a fixed longitudinal axis of rotation defined by point 22. Weights 24 on frame 14 below the axis of rotation cause the container 12 and frame 14 to remain in the upright position, as shown, until a rolling force is applied to it. The amount of weight may be varied depending on the load to be balanced. Rolling force is applied by actuator arm 26 pivotally attached at 28 to frame 14, preferably below the axis of rotation 22. The closer point 28 is to the axis of rotation 22, the greater will be the angular sweep of the carriage frame 14. The other end of the actuator arm is pivotally connected at 30 to a Scotch-yoke conversion plate 32 which moves transversely between upper and lower guides 34 and 36. This conversion plate 32 has a vertical slot 38 therein in which pin 40 moves.

Pin 40 extends from arm 42 which rotates about pivot point 44 in response to the chain drive 46 that is actuated by an electric motor 48. As can be seen as the electric motor 48 moves the chain drive 46 and arm 42 in a clockwise direction, the conversion plate 32 moves to the left and then to the right along guides 34 and 36. This movement through actuator arm 26, causes the carriage frame 14 and cargo container 12 to tilt or rock about axis 22. The measurements are such that the tilt is 45 degrees. If arm 42 is shortened, such as by placing pin 40 at arm aperture 50, the degree of rock is less, 30 degrees for example. Further, the speed of motor 48 can be varied or the chain drive sprockets can be changed to vary the period of oscillation. Thus, the simulator may be adjusted for cargo weight, degree of roll, and time period for roll.

Reference is made to FIGS. 2 and 3 for comparing a 45 degree roll with a 30 degree roll within the same time period of 13 seconds for example. It is noted that the magnitude of the vertical acceleration waveform 52, side wall loading waveform 54 and lateral acceleration waveform 56 for the 30 degree roll shown in FIG. 2 is less than that of their counterparts 58, 60, and 62 for the 45 degree roll shown in FIG. 3. These waveforms provide a record of the conditions to which cargo and their restraint systems are subjected under test.

The invention in its broader aspects is not limited to the specific combinations, improvements, and instrumentalities described but departures may be therefrom within the scope of the accompanying claims without departing from the principles of the invention and without sacrificing its chief advantages.

What is claimed is:

1. A shipboard transportation simulator consisting of a base,
revolvable rollers mounted on said base,
a carriage frame supporting a cargo container with variable cargo,
arcuate rails mounted on said frame,
said rails operatively engaging said rollers for movement,
Scotch-yoke means for oscillating said frame on said rollers through said rails,
said frame adapted to rock about a stationary axis of rotation,
said frame having a center of gravity above said axis of rotation,
adjustable weights on said frame for lowering the center of gravity of said container and frame to said axis of rotation.

2. The shipboard transportation simulator in claim 1 wherein said weight means extends downwardly from and rocks with said carriage frame and is adjustable in its length below said axis of rotation.

3. A shipboard transportation simulator as in claim 1 wherein the degree of roll, the frequency of roll, and the weight of cargo in said container may be varied.

4. A shipboard transportation system as in claim 1 wherein a reverse pendulum harmonic motion is provided with said cargo container.

* * * * *